United States Patent
Denny et al.

(10) Patent No.: US 7,093,505 B2
(45) Date of Patent: Aug. 22, 2006

(54) SPEED SENSOR AND METHOD OF ATTACHING THE SAME

(75) Inventors: Wayne V. Denny, Alliance, OH (US); Richard Smith, Canton, OH (US); Kevin Rehfus, North Canton, OH (US)

(73) Assignee: The Timken Company, Canton, OH (US)

( * ) Notice: Subject to any disclaimer, the term of this patent is extended or adjusted under 35 U.S.C. 154(b) by 23 days.

(21) Appl. No.: 10/521,611

(22) PCT Filed: Jul. 16, 2003

(86) PCT No.: PCT/US03/22135

§ 371 (c)(1),
(2), (4) Date: Jan. 14, 2005

(87) PCT Pub. No.: WO2004/008155

PCT Pub. Date: Jan. 22, 2004

(65) Prior Publication Data

US 2006/0048573 A1 Mar. 9, 2006

Related U.S. Application Data

(60) Provisional application No. 60/396,587, filed on Jul. 17, 2002.

(51) Int. Cl.
*G01L 3/02* (2006.01)
(52) U.S. Cl. .................... 73/862.326; 73/488; 73/493; 73/494
(58) Field of Classification Search ........... 73/862.326, 73/494, 493
See application file for complete search history.

(56) References Cited

U.S. PATENT DOCUMENTS

| 5,951,191 | A | 9/1999 | Schroeder et al. |
| 6,062,529 | A | 5/2000 | Stevenson et al. |
| 6,070,865 | A | 6/2000 | Schroeder et al. |
| 6,123,301 | A | * | 9/2000 | Schroeder et al. .......... 248/200 |
| 6,176,636 | B1 | 1/2001 | Stevenson et al. |
| 6,338,190 | B1 | 1/2002 | Stevenson et al. |

(Continued)

FOREIGN PATENT DOCUMENTS

DE 10034844 A1 4/2001

(Continued)

*Primary Examiner*—Edward Lefkowitz
*Assistant Examiner*—Freddie Kirkland, III
(74) *Attorney, Agent, or Firm*—Polster, Lieder, Woodruff & Lucchesi, L.C.

(57) ABSTRACT

A speed sensor (B, C) produces a signal that reflects the angular velocity of a shaft (4) which rotates in a case (2) having a mounting surface (10), beyond which the shaft projects to provide a target (6), and threaded holes (12) which open out of the mounting surface. The speed sensor includes a housing (20) and a sensing element (22) which is embedded in the housing. The housing, which is formed from a deformable material, has slots (44, 60) which align with the threaded holes in the case, and receive screws (24, 66) which thread into the holes to secure the speed sensor to the case. The speed sensor is positioned such that the proper air gap exists between its sensing element and the target. The screws, which extend through the slots, produce indentations (56, 74) in the deformable material of the housing, and these indentations receive the screws, so that the position of the sensor is fixed. Thus, the sensor, if removed, may be reinstalled in the same location.

13 Claims, 4 Drawing Sheets

U.S. PATENT DOCUMENTS 6,453,732 B1 9/2002 Schroeder et al.
2002/0007675 A1* 1/2002 Yamashita .................. 73/493
2005/0260779 A1* 11/2005 Krijnen ..................... 438/22

FOREIGN PATENT DOCUMENTS

EP 00694765 A1 1/1996

* cited by examiner

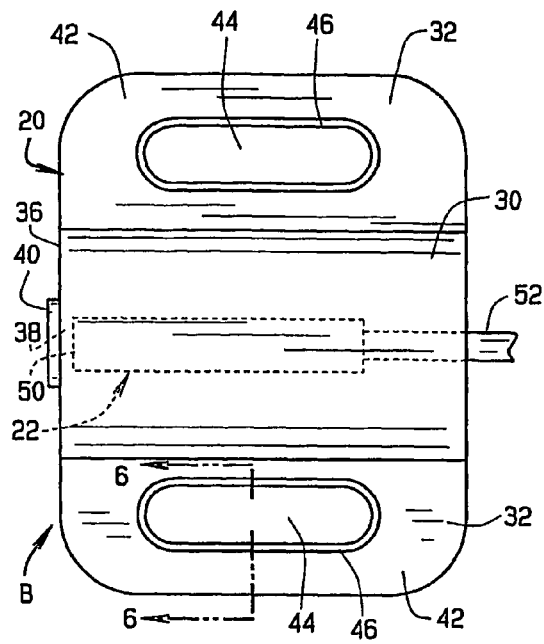
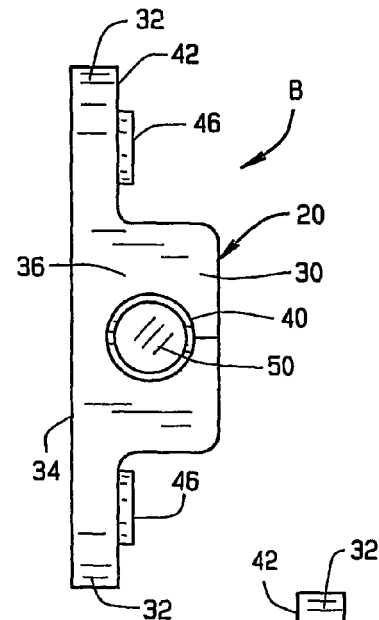
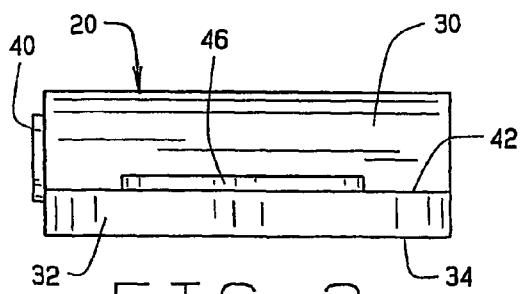
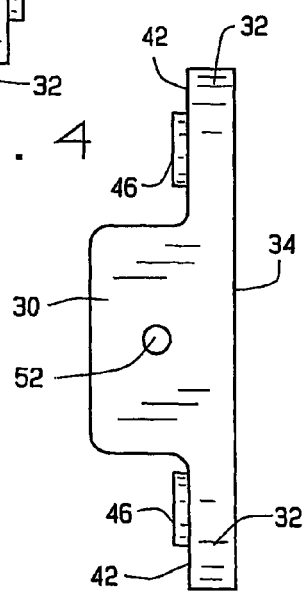
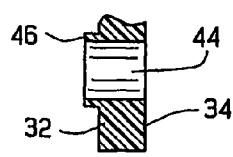
FIG. 2
FIG. 4
FIG. 3
FIG. 5
FIG. 6

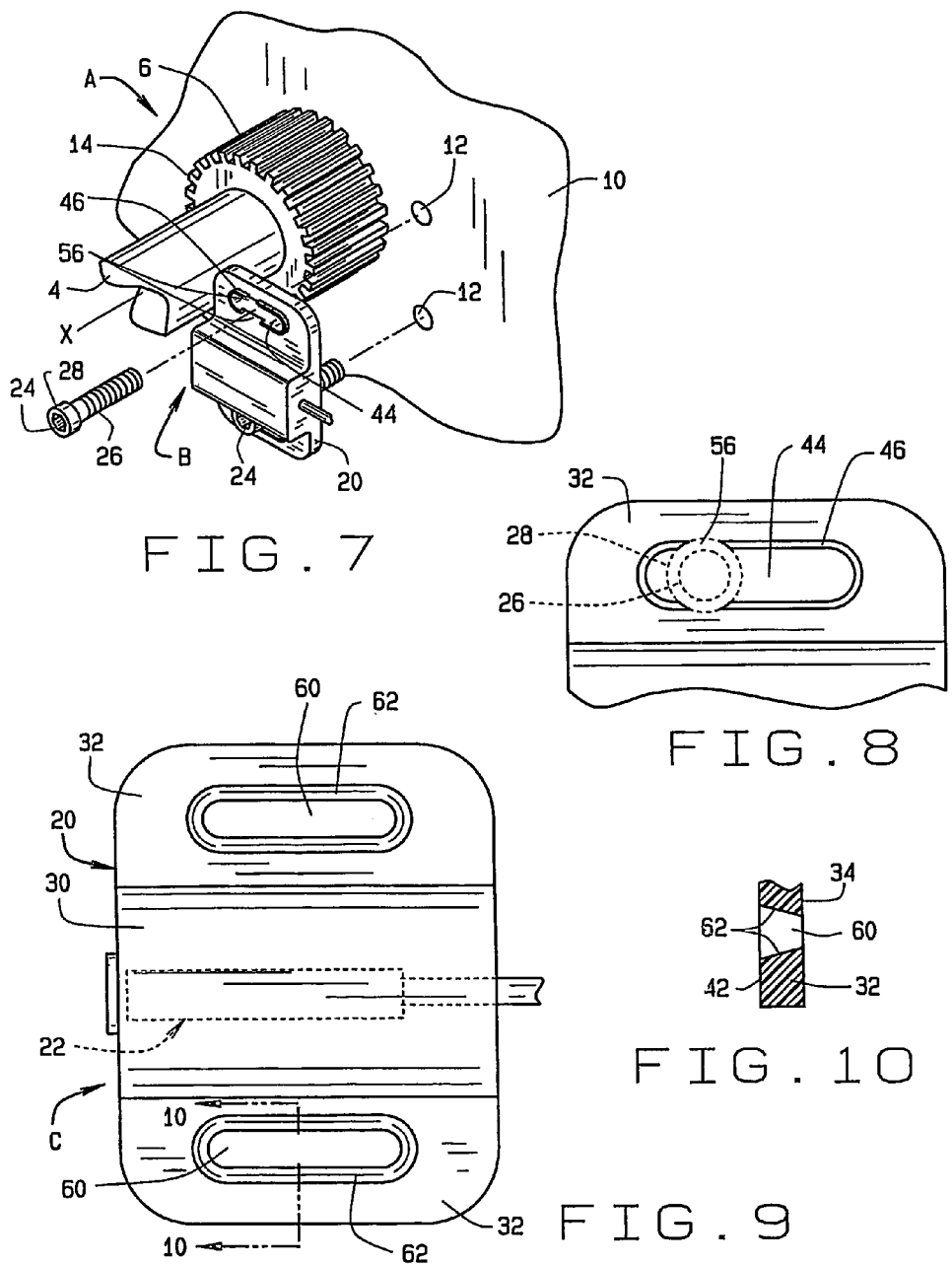

SPEED SENSOR AND METHOD OF ATTACHING THE SAME

CROSS REFERENCE TO RELATED APPLICATIONS

This application derives and claims priority from International Application PCT/US03/022135, filed 16 Jul. 2003, and published under International Publication No. WO 2004/008155 A1, and from U.S. provisional application 60/396,587, filed 17 Jul. 2002.

TECHNICAL FIELD

This invention relates in general to speed sensors for monitoring the angular velocities of rotating devices, and more particularly to a speed sensor, which, once installed, may be reinstalled in the same location, and to a process for installing a speed sensor.

BACKGROUND ART

A variety of sensors exist for monitoring the angular velocities of rotating shafts—sensors which are connected to control systems that in one way or another control the operation of such shafts or other machine elements. The typical sensor mounts on a stationary component of a machine opposite a shaft which rotates in that component. The shaft carries a target along its periphery, and the target has the capacity to produce a pulsating signal in the sensor, which signal is monitored by the control system. The target may take the form of alternating ridges and valleys on a gear or spline, or may take the form of a keyway or even pins. It may also assume a magnetic form, consisting of magnetic poles. Sensors assume two basic forms—passive and active. A passive sensor does not require any power from the control system to operate it. But it does require a very small and accurate air gap, and it will not register credible speeds at low angular velocities. A variable reluctance sensor represents one type of passive sensor. An active sensor requires power from the control system and will operate effectively with larger air gaps and at lower speeds. Active sensors are better suited for traction control systems and in assemblies where the air gap is difficult to accurately control. Moreover, some active sensors can sense direction. A Hall-effect sensor represents one type of active sensor.

For a sensor to operate effectively, the air gap between it and the target that it monitors must fall within prescribed tolerances. This requires a good measure of precision during the manufacture of the sensor and the component on which it is installed, or during the installation of the sensor, or both. These exacting demands must also be met during subsequent maintenance procedures which require removal of the sensor and reinstallation. In one type of sensor mounting a hard stop on the sensor seats against a surface on the stationary machine component, thus controlling an air gap with a good measure of precision. The sensor may be removed and reinstalled without too much concern about altering the air gap. However, the sensor and the seat against which its hard stop bears must be manufactured with considerable precision. When a sensor is mounted on a surface that lies perpendicular to or at a substantial angle to the axis of the shaft, no hard stop or seat exists to fix the position of the sensor, while the original installation of such a sensor may be easy, without a hard stop, the reinstallation of the sensor after a maintenance procedure requires exacting efforts.

SUMMARY OF THE INVENTION

The present invention resides in a speed sensor which is attached to a mounting surface with at least one screw that extends through a slot in the sensor. The screw creates an indentation along the slot, and the indentation serves to locate the sensor in the same position when the sensor is removed and later reinstalled. The invention also resides in the process for installing the sensor, using the screw to create an indentation in the sensor.

BRIEF DESCRIPTION OF DRAWINGS

FIG. 2 is a front elevational view of the sensor;

FIG. 3 is a side elevational view of the sensor;

FIG. 4 is a front end elevational view of the sensor;

FIG. 5 is a rear elevational view of the sensor;

FIG. 6 is a fragmentary sectional view of the sensor taken along line 6—6 of FIG. 2;

FIG. 7 is an exploded perspective view of the machine and sensor showing the sensor upon being prepared for reinstallation with the indentations in the rims surrounding its slots serving to locate the sensor in the proper position;

FIG. 8 is a fragmentary plan view showing the indentation along one of the slots and the position assumed by the screw in those indentations;

FIG. 9 is a plan view of a modified speed sensor embodying the present invention;

FIG. 10 is a fragmentary sectional view taken along line 10—10 of FIG. 9;

Corresponding reference characters indicate corresponding parts throughout the several views of the drawings.

BEST MODE FOR CARRYING OUT THE INVENTION

Figure 1:
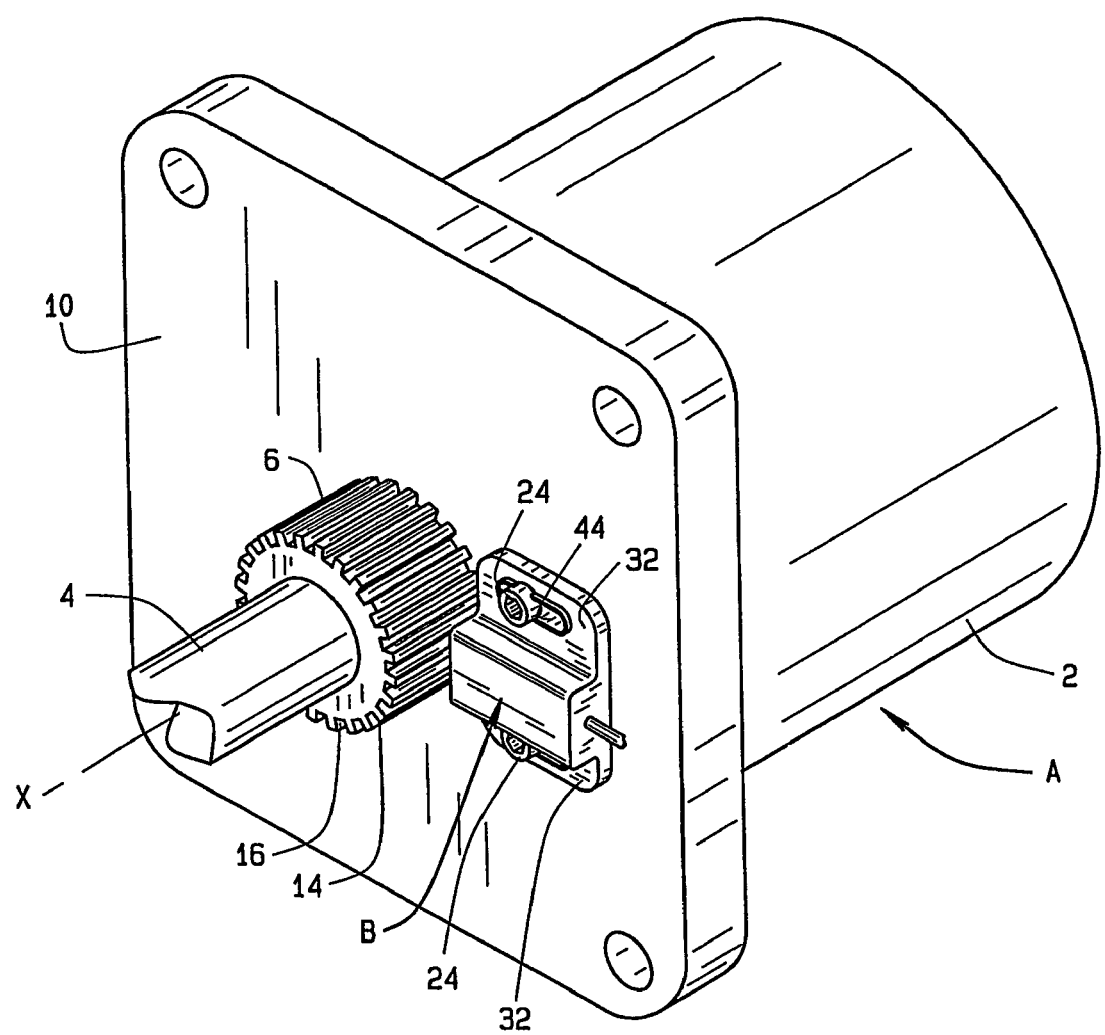
FIG. 1 is a perspective view of a machine provided with a speed sensor constructed and installed in accordance with the present invention.

Referring now to the drawings, a machine A (FIG. 1) includes a stationary housing or case 2 in which a shaft 4 rotates about an axis X. The shaft 4 carries a target 6 which rotates with it, and the rotation of the target 6—and likewise the shaft 4—is monitored by a speed sensor B which is attached to the case 2. The sensor B, in response to the rotation of the target 6, produces a pulsating signal, which reflects the angular velocity of the shaft 4. Indeed, the sensor B may be connected to a control system which controls the speed at which the shaft 4 rotates or the function of some other machine element.

Briefly, the case 2 is preferably a metal casting which is machined along appropriate surfaces. One of those surfaces is a mounting surface 10 beyond which the shaft 4 projects. The surface 10 lies perpendicular to the axis X of the shaft 4, or at least at a steep angle with respect to the axis X. The case 2 contains at least two threaded holes 12 (FIG. 7) which open out of the surface 10, yet lie parallel to the axis X. The target 6 encircles the shaft 4 adjacent to where the shaft 4 emerges from the surface 10 of the case 2. The target 6 possesses a succession of ribs or teeth 14 which are arranged in a pattern around the axis X—most often at equal circumferential intervals—and as such are separated by axially directed grooves 16. The outermost surfaces of the ribs or teeth 14 describe a circle—or, more accurately, a cylinder—having its center at the axis X.

The sensor B includes (FIG. 2) a housing 20, which is preferably molded from a polymer, and a sensing element 22 which is embedded in the housing 20, preferably with the housing 20 over-molded around the sensing element 22. The sensor B is secured to the case 2 with machine screws 24 (FIGS. 1 & 7) having shanks 26 which thread into the holes 12. The screws 24 at the ends of their shanks 26 have heads 28 provided with circular peripheries, and those heads 28 bear firmly against the housing 20 of the sensor B to hold the sensor B in place.

The housing 20 has (FIGS. 2–5) a raised central portion 30 and two flanges 32 which project laterally from the central portion 30. Across the central portion 30 and the two flanges 32 extends a planar back face 34 which bears against the mounting surface 10 of the case 2. The central portion 30 has an end face 36 which is presented toward axis X and the target 6. The central portion 30 also contains a cylindrical bore 38 which opens out of the end face 36. Indeed, the bore 38 extends out into a sacrificial layer or rim 40 which projects beyond the end face 36.

Each flange 32 possesses (FIGS. 2–5) a front face 42 which lies parallel to the back face 34. Moreover, each contains a slot 44 that extends completely through it from its front face 42 to its back face 36, with the major axis of the slot 44 being parallel to the axis of the bore 38. The two slots 44 are wide enough to loosely receive the threaded shanks 26 of the machine screws 24, but not the heads 28 of the screws 24, and are spaced apart a distance corresponding to the spacing between the threaded holes 12 in the case 2. Each slot 44 is surrounded by a rim 46 which projects away from the front face 42 of its flange 32 (FIG. 6), yet is formed integral with the flange 32. The inside face of the rim 46 for each flange 32 lies flush with the surface of its slot 44. Typically, the thickness of each rim 46 should be between 0.038 and 0.042 in. and its height should likewise be between 0.038 and 0.042 in.

The rims 46 at least should be formed from a deformable material which can be permanently crushed to create an indentation that corresponds in size to the implement used to crush it. Certain polymers are suitable for this deformable material, among which are PVC, acetal, nylon and PCS. Some metals of a ductile character will also suffice. The deformable material enables the rims 46 to serve as crush pads. As a practical matter, the entire housing 20 is formed as an integral unit from the deformable material.

The sensing element 22 is embedded within central portion 30 of the housing 20 (FIGS. 2 & 4) and for the most part is generally cylindrical. It aligns with the cylindrical bore 38 that opens out of the end face 36 and has a sensing face 50 which is exposed through the bore 38. Indeed, the sensing face 50 lies a prescribed distance from the end of the sacrificial rim 40 on the housing 20, and that distance corresponds to the air gap at which the sensing element 22 will operate most effectively. The sensing element 22 also includes a cable 52 which emerges from the central portion 30 of the housing 20 and delivers the signal produced by the sensing element 22 to a control system.

The sensing element 32 may assume any of several common designs. It may be passive or active, whatever best suits the conditions under which it is to operate and the speed of the target 6. Those that operate on the Hall-effect principle are particularly suited for the sensing element 32, although variable reluctance and magneto resistive sensors will also suffice as will others.

To install the senor B on the case 2 of the machine A, the slots 44 in the flanges 32 of the sensor B are aligned with the threaded holes 12 in the case 2, with the back face 34 of the sensor housing 20 presented toward the planar mounting surface 10 on the case 2 and the sacrificial rim 40 that is around the bore 38 presented toward the target 6.

Thereupon, the shanks 26 of the machine screws 24 are inserted through the slots 44 in the flanges 32 of the sensor B and engaged with the threads of the threaded holes 12. The screws 24 are turned down until the undersides of their heads 28 bear lightly against the rims 46 that surround the slots 44. This brings the back face 34 of the sensor housing 20 lightly against the mounting surface 10 on the case 2. The clamping force produced by the screws 24 at this juncture is perhaps large enough to prevent the sensor B for changing position under its won weight, but is not great enough to prevent a light manually exerted force from displacing the sensor B, nor is it great enough to deform the rims 46 that surround the slots 44. Next the sensor B is manually adjusted to bring the sacrificial rim 40 on its housing 20 against the target 6—specifically, against the teeth 14 that form the target 6. This establishes the correct air gap between the sensing face 50 of the sensing element 22 and the circle described by the teeth 14 of the target 6. With the sensor B so positioned, the machine screws 24 are tightened. As the screws 24 are turned downwardly, their heads 26 sink into and crush or otherwise permanently deform the rims 46 that surround the slots 44, but only where the undersides of the heads 26 contact the rims 46. Elsewhere, the rims 46 remain intact and in their original configurations. In other words, the heads 26 of the screws 24 create permanent indentations 56 (FIGS. 7 & 8) in the rims 46 that surround the slots 44. The force exerted by the screws 24 on the housing 20 of the sensor B forces the back face 34 of the housing 20 firmly against the mounting surface 10 on the case 2, and the friction between the face 34 and surface 20 alone is enough to hold the sensor B in place on the case 2. But the location of the sensor B is further secured by virtue of the heads 26 of the screws 24 being snugly received in the indentations 56 formed in the rims 46 that surround the slots 44 (FIG. 8).

When the shaft 4 begins to rotate, the teeth 14 of the target 14 may abrade the sacrificial rim 40 at the end face 36 of the sensor housing 20, but only a minute quantity of the material from which the housing 20 is formed wears away. The air gap between the sensing face 50 of the sensor element 22 and the circle described by the teeth 14 of the target 6 remains unchanged and at the dimension best suited for operation of the sensor B.

As the teeth M on the rotating target 6 pass by the sensing face 50 of the sensing element 22, they disturb a magnetic field created by the sensing element 32, and the sensing element 22 detects these disturbances, producing a pulsating electrical signal that reflects the angular velocity of the target 6 and the shaft 4 which carries the target 6. Depending on its type, the sensor 22 may also register the direction of rotation.

Should it become necessary to remove the sensor B to perform maintenance on it or other components of the machine A, the screws 24 which hold the sensor B in place are simply backed off and removed from their holes 12 in the case 2. This frees the sensor B from the case 2. Once the maintenance is complete, the sensor B is again placed against the case 2 and the screws 24 are inserted in the holes 12 in the housing 20. Instead of realigning and repositioning the sensor B with respect to the target 6, the sensor B is simply maneuvered until the indentations 56 in the rims 46 surrounding its slots 44 lie beneath the heads 28 of the screws 24 (FIG. 7). Thereupon, the screws 24 are turned down. Their heads 28 enter the indentations 56 in the rims 46 and position the sensor B in essentially the same location that it had before, so the air gap remains functionally unchanged. This holds true irrespective of whether the sensor B was installed initially with the use of the sacrificial rim 40.

A modified sensor C (FIGS. 9–12) likewise has a housing 20 provided with a central portion 30 and flanges 32 projecting from the central portion 30 and, in addition, likewise has a sensing element 22 embedded within the central portion 30 of the housing 20. The flanges 32 contain slots 60 provided with side walls 62. The slots 60 are similar to the slots 32 for the sensor B in the sense that the spacing between them equals the spacing between the threaded holes 12 in the case 2, but they differ in that their side walls 62 taper downwardly toward the back face 34 (FIG. 10), so that the slots 60 are narrower at the back face 34 than at the front faces 42 of the flanges 32. Indeed, at the back face 34 the slots 44 are narrower than the diameter of the threaded holes 12.

The sensor C is secured to the case 2 with machine screws 66 which may differ from their counterparts for the sensor B. To be sure, each screw 66 has a threaded shank 68 and a head 70 at one end of the shank 68. In addition, each screw 66 has a cylindrical pilot 72 extended from the other end of its shank 68. The head 70 is too large to pass through the slot 60 or even enter the slot 60. However, the pilot 72 is small enough to pass into and through the slot 60 and is also small enough to enter the threaded hole 12, but only with a slight clearance. The threaded shank 68, while being sized and otherwise configured to engage the threads of the threaded holes 12, is small enough to enter the slot 60 at the front face 42 of the flange 32 in which the slot 60 is located, but is too large to pass completely through the slot 60, this being by reason of the taper of the walls 62 for the slot 60. The housing 20 for the sensor C, at least along the side walls 62 of its slots 60, is formed from a deformable material—one which can be easily broken away or otherwise displaced to create an indentation that corresponds to the implement used to effect the deformation.

Figure 11:
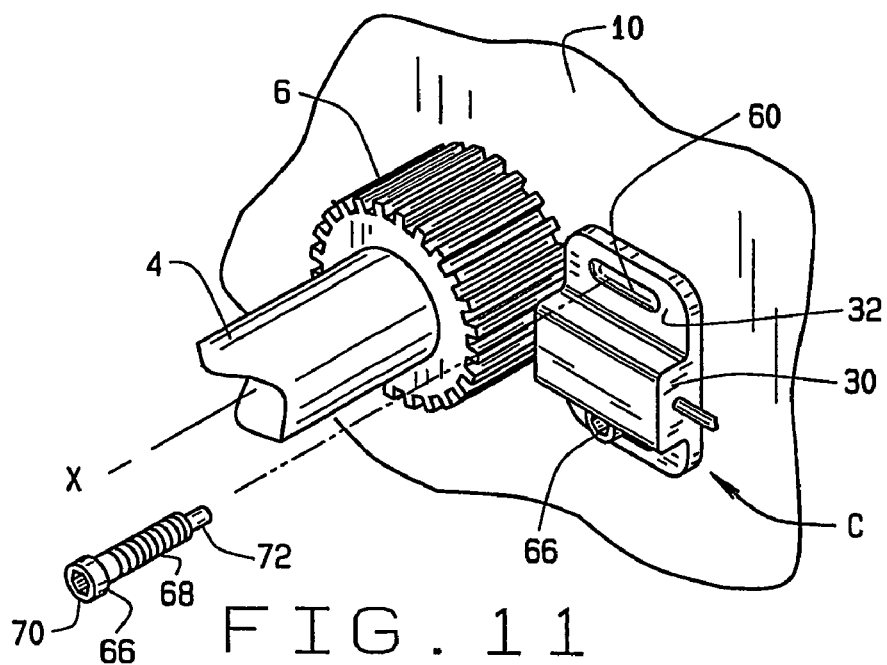
FIG. 11 is a perspective view showing the modified sensor installed in a machine.
Figure 12:
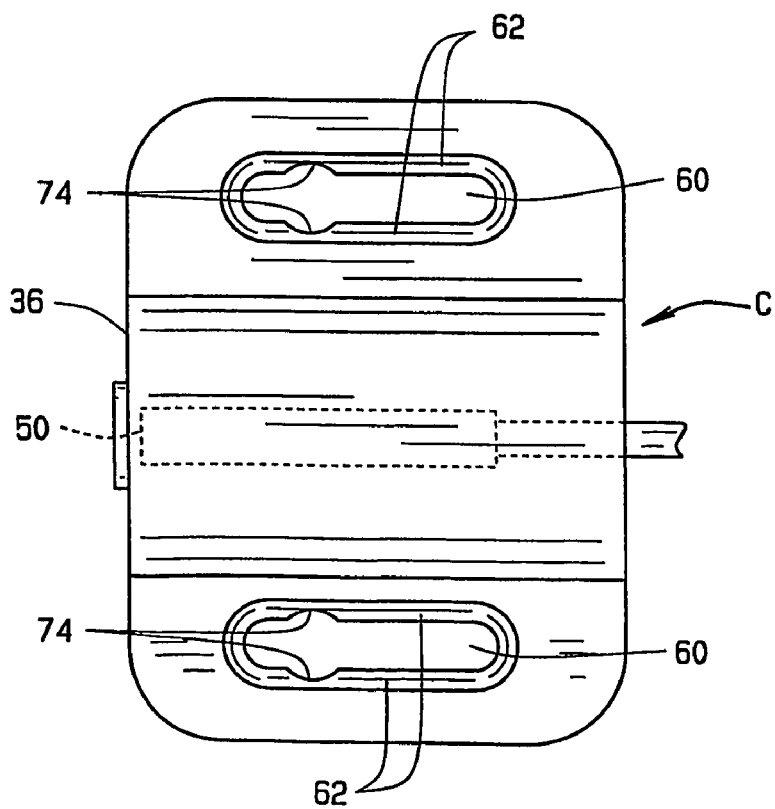
FIG. 12 is a plan view of the modified sensor showing the indentations formed by the screws which mount it.

To install the sensor C on the case 2, the sensor housing 20 is placed against the mounting surface 10 on the case 2 with the slots 60 in its flanges 32 aligned with the threaded holes 12 in the case (FIG. 11). Then the screws 66 are inserted into the slots 60 with their pilots 72 leading and aligned with the threaded holes 12. The pilots 72 enter the holes 12, thus allowing the threaded shanks 68 to advance into the slots 60 until they are restrained by the tapered side walls 62. Thereupon, the sensor C is manipulated manually until it assumes the proper position—one in which the correct air gap exists between the sensing face 5 of the sensing element 32 and the teeth 14 on the target 6—and the sacrificial rim 40 may be used to this end. Once the sensor C assumes the correct position, the screws 66 are forced inwardly into the threaded holes 12. The threaded shanks 68 break through the side walls 62 of the slots 60, creating indentations 74 (FIG. 12) that receive the threaded shanks 72. This allows the thread shanks 72 to pass completely through the slots 60 to the holes 12, whereupon when turned, they engage the threads of the holes 12. The screws 66 are rotated until their heads 70 seat firmly against the front faces 42 of the flanges 32.

The indentations 74 serve to locate the sensor C in precisely the same position on the case 2 if the sensor C needs to be removed.

The housings 20 of the sensors B and C may be constructed with single slot 44 or 60 and secured with a single screw 24 or 60, in which event a pin or surface may be used to prevent the sensor B or C from rotating about a single screw 24 or 66. On the other hand, two screws 24 or 66 may be located in a single slot 44 or 60. The target, which the sensors B or C, monitor may have magnetic poles instead of teeth 14. Also, the target 6, which the sensor B monitors, need not be on a shaft 4 that emerges from the surface 10 of the case 2, but may be on a rotating device that revolves adjacent to or near the surface 10.

The invention claimed is:

1. In combination with a mounting surface out of which a threaded hole opens and with a target which rotates in front of the surface about an axis that is oriented at a steep angle with respect to the surface, and with a screw having a threaded shank that threads into the hole and a head at the end of the shank;
   a sensor for monitoring the rotation of the target; said sensor comprising:
   a housing located along the mounting surface and having a slot that is aligned with the threaded hole, the housing along the slot being formed from a deformable material and containing a permanent indentation that receives a portion of the screw, the indentation having been formed by the screw itself and being of a configuration that prevents displacement of the slot along the screw when the portion of the screw is in the indentation; and
   a sensing element located in the housing and being capable, in response to rotation of the target, of producing a signal that reflects the angular velocity of the target;
   whereby the sensor, should it be removed from the mounting surface by withdrawing the screw from the threaded hole, may be reinstalled in the same position by again threading the screw into the hole such that the portion of it is received in the indentation.

2. The combination according to claim 1 wherein the housing has a front face; wherein the slot opens out of the front face; and wherein the deformable material forms a rim along the slot, with the rim projecting beyond the front face.

3. The combination according to claim 2 wherein the rim on the housing contains the indentation and the head of the screw is received in the indentation.

4. The combination according to claim 1 wherein the housing has a front face and a back face; wherein the slot opens out of both faces and has side walls which taper downwardly toward the back face so that the slot is wider at the front face than it is at the back face; and wherein the deformable material is located along the side walls of the slot.

5. The combination according to claim 4 wherein the indentation opens out of the tapered side walls of the slot and is configured to receive the shank of a screw.

6. The combination according claim 1 wherein the slot is one of two slots in the housing, and the slots are parallel; wherein the threaded hole is one of two holes that open out of the mounting surface; and wherein the screw is one of two screws, with each screw being in a different slot and threaded into a different hole.

7. The combination according to claim 1 wherein the housing includes a sacrificial rim which projects beyond the sensing element a prescribed distance to establish a known gap between the target and the sensing element.

8. A process for installing a speed sensor against a mounting surface out of which a threaded hole opens so that the speed sensor can monitor the rotation of a target that revolves in front of the mounting surface about an axis oriented at a steep angle with respect to the surface, the sensor including a housing having a slot and along the slot being formed from a deformable material, the sensor further including a sensing element located in the housing and being capable, in response to rotation of the target, of producing a signal that reflects the angular velocity of the target, said process comprising:

placing the housing of the sensor against the mounting surface with the slot in the housing aligned with the threaded hole that opens out of the mounting surface;

inserting a screw having a threaded shank and a head into the slot in the housing;

positioning the housing along the mounting surface with the correct gap between the sensing element and the target;

with a portion of the screw; forming a permanent indentation in the housing along the slot, with the indentation being configured such that, when the portion of the screw that formed it is in the indentation, the housing cannot be displaced along the slot; and threading the screw into the threaded hole.

9. The process according to claim 8 wherein the head of the screw forms the indentation.

10. The process according to claim 8 wherein the housing has a front face; wherein the slot opens out of the front face; wherein the deformable material forms a rim along the slot, with the rim projecting beyond the front face, and wherein the head of the screw forms the indentation in the rim.

11. The process according to claim 8 wherein the shank of the screw forms the indentation.

12. The process according to claim 8 wherein the housing has a front face and a back face; wherein the slot opens out of both faces and has side walls which taper downwardly toward the back face so that the slot is wider at the front face than it is at the back face; wherein the deformable material is located along the side walls of the slot, and wherein the shank of the screw forms the indentation in the side walls of the slot.

13. The process according to claim 8 and further comprising:

withdrawing the screw from the threaded hole;

removing the sensor from the mounting surface;

thereafter placing the sensor along the mounting surface with its slot aligned with the hole;

inserting the screw through the slot and threading it into the hole, with said portion of the screw being received in the indentation;

whereby the sensor assumes the same position along the mounting surface.

* * * * *